United States Patent [19]
McDonough et al.

[11] Patent Number: 5,128,987
[45] Date of Patent: Jul. 7, 1992

[54] TELEPHONE-RESPONSIVE DEVICE FOR MUTING THE SOUND OUTPUT OF A TELEVISION SET

[75] Inventors: William B. McDonough, Anaheim Hills, Calif.; John Sheridan, 2459 Century Hill, Los Angeles, Calif. 90067

[73] Assignee: John Sheridan, Los Angeles, Calif.

[21] Appl. No.: 493,907

[22] Filed: Mar. 15, 1990

Related U.S. Application Data

[63] Continuation-in-part of Ser. No. 300,821, Jan. 23, 1989, abandoned.

[51] Int. Cl.⁵ .............................................. H04M 11/00
[52] U.S. Cl. ..................................... 379/102; 379/104; 379/110; 358/194.1
[58] Field of Search .............. 379/102, 104, 105, 66, 379/375, 378, 395, 110, 373; 358/194.1; 455/603

[56] References Cited

U.S. PATENT DOCUMENTS

| | | | |
|---|---|---|---|
| 4,243,973 | 1/1981 | Sandidge | 379/102 |
| 4,425,477 | 1/1984 | Magil | 379/110 |
| 4,438,527 | 3/1984 | Hammond | 379/102 |
| 4,566,034 | 1/1986 | Harger et al. | 358/194.1 |
| 4,805,206 | 2/1989 | Beom-Chae | 379/102 |
| 4,807,052 | 2/1989 | Amano | 358/194.1 |
| 4,882,747 | 11/1989 | Williams | 379/53 |
| 4,885,579 | 12/1989 | Sandbank | 358/194.1 |
| 4,908,604 | 3/1990 | Jacob | 340/539 |

FOREIGN PATENT DOCUMENTS 0215248 9/1988 Japan ............................. 379/110

OTHER PUBLICATIONS

Genie ® Trac-Drive Automatic Garage Door Opener System, p. 20, Owners Manual, Sep. 1985.

Primary Examiner—Jin F. Ng
Assistant Examiner—Stella L. Woo
Attorney, Agent, or Firm—Gene W. Arant

[57] ABSTRACT

Apparatus responsive to the operation of a nearby telephone for selectively muting the sound output of a television set, including a ring detection circuit and an off-hook detection circuit coupled in parallel and responsive to either a ringing signal or an off-hook condition of the telephone for delivering an activating signal to a common output, remote-control circuitry selectively operable for muting the sound output of a television set, a controller circuit coupled between the common output and an input of the remote-control circuitry, and manually operated selection switches for providing four different modes of operation. In preferred embodiments the controller includes a plurality of permanently fixed internal logic circuits which respectively correspond to different remote volume control codings of various different makes or models of television sets, and manually operable circuitry are provided for selecting a particular one of the fixed internal logic circuits so as to enable the remote-control circuitry to mute the sound output of a television set whose remote volume control coding corresponds to that praticular fixed logic circuit.

26 Claims, 3 Drawing Sheets

TELEPHONE-RESPONSIVE DEVICE FOR MUTING THE SOUND OUTPUT OF A TELEVISION SET

RELATED APPLICATION

This application is a continuation-in-part of our prior copending application Ser. No. 300,821 filed Jan. 23, 1989, now abandoned.

BACKGROUND OF THE INVENTION

It is commonplace in homes today to have a telephone instrument and a television set located in close proximity to each other. Since there is no interface between the two pieces of equipment the user must control each one separately, and conflicts in the operation of the two pieces of equipment sometimes arise.

More specifically, many television sets of recent manufacture are equipped with a remote control device for controlling ON-OFF, channel selection, volume, and selective muting functions. Such a remote control device typically operates by means of an infrared signal that is transmitted to the TV set, and requires positive actuation by a human operator either to initiate or to terminate the muting of the sound from the television set.

The telephone may be a single instrument located in the same room as the TV set, and when it rings in response to an incoming call there is an immediate conflict between the sound systems of the two appliances. If the person who is watching the television set also answers the telephone call, then he or she would ordinarily want to mute the sound output of the television set. But, if one person in the room is watching the TV while a second person in the same room places an outgoing call on the telephone, the continuing sound from the TV will interfere with the telephone caller, or vice versa, unless the person watching the TV takes necessary action for muting the TV sound.

Quite commonly a residence has several telephone instruments on a single telephone line but located in different rooms. In that situation the nature of the conflict between telephone and television is somewhat different. Specifically, if someone in a room other than where the television set is located wishes to place an outgoing call on the telephone, there would be no necessity for muting the sound of the TV set. But for an incoming call that necessity would still exist.

PRIOR ART

Prior art includes U.S. Pat. No. 4,626,848 issued Dec. 2, 1986 and entitled PROGRAMMABLE FUNCTIONS FOR RECONFIGURABLE REMOTE CONTROL ("the G E patent"), and U.S. Pat. No. 4,805,206 issued Feb. 14, 1989 and entitled FUNCTION CONTROLLER SERVING AS AN AUTOMATIC TELEPHONE ANSWERING MACHINE IN AN AUDIO/VIDEO COMPONENT SYSTEM ("the Sam Sung patent").

The Sam Sung patent shows a controller which responds to the detection of a telephone ringing signal for reducing the volume level of an amplifier in an audio sound system. The G E patent shows a universal remote control device which has to "learn" the volume control code for a particular type of equipment such as a television set with which it is being used. Further, that particular device stores the coding information in an active circuit, and when power is lost the code identity is also lost.

SUMMARY OF THE INVENTION

The present invention provides a remote control device for use with a telephone and with a nearby television set for automatically responding to a signal from the telephone to mute the sound output of the television set so long as the telephone is in use, and whose operation may also be modified by manual control.

According to one particular feature of the present invention the device fully accommodates the situation where a single phone line runs to multiple instruments located in different rooms.

According to another particular feature of the present invention the device is adaptable to television sets of different makes, and the user of the device may manually enter A TV set selection which will thereafter be operable with a particular TV set.

Thus the apparatus of the present invention is responsive to the operation of a nearby telephone for muting the sound output of a television set, and includes signal responsive means coupled to the telephone for detecting either a ringing signal or an off-hook condition of the telephone, and for producing an output signal in response thereto; and remote-control means having an input coupled to the signal responsive means and responsive thereto for muting the sound output of the television set. Manually controlled switches provide flexibility in the operation and use of the device.

In accordance with one particular feature the invention includes manually operable means for selectively disabling the signal responsive means to respond to an off-hook condition of the telephone while still permitting it to respond to a ringing signal, thus accommodating multiple telephone instruments located in different rooms.

In accordance with another particular feature of the invention a microchip controller circuit is provided with a plurality of permanently fixed internal logic circuits which respectively correspond to different remote volume control codings of various different makes or models of television sets, and means external to the microchip circuit for manually selecting a particular one of those logic circuits. Further, the permanent logic circuits are constructed in the form of "firmware" which does not require continuous energization in order to retain code identity information.

In the presently preferred form of the invention the remote control device is provided with manually settable switches that can be set to match the code of a particular television set with which it is being used. The microchip controller circuit then responds to an activating signal at its input for producing at its output a coded signal which is then transmitted through the infrared signal transmitting means to the selected television set and mutes the output sound volume so long as an activating signal continues to be received from the telephone. Thus, the device is conveniently usable with the television sets of different manufacturers.

In the preferred embodiment of the invention a dual-inline-package switch (DIP switch) is employed for the set selection. In an alternate form of the invention the selection of the remote control code for a particular television set is accomplished by means of a conventional key pad, and the result stored in an active memory in the microchip controller circuit.

Thus one object and purpose of the invention is to provide a remote control device responsive to telephone operation for automatically muting the sound output of a TV set, but which may also be manually controlled to modify its operation.

Another object and purpose of the invention is to provide a remote control device responsive to telephone operation which may be used with any one of a number of different television sets for automatically muting the sound output volume of the television set, and which may be manually set to correspond to the code for any selected one of the different television sets.

DRAWING SUMMARY

FIG. 4b is a side elevation view of the switch of FIG. 4a;

DETAILED DESCRIPTION

Figure 1:
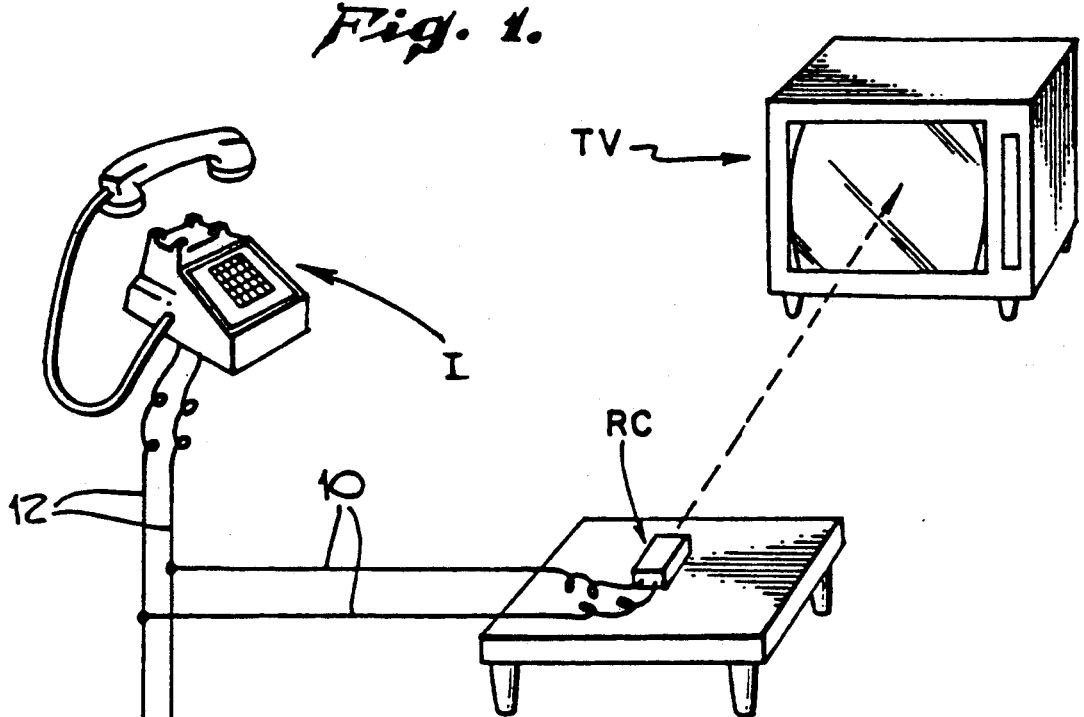
FIG. 1 is a perspective view showing the invention in its relation to an associated telephone instrument and an associated television set.

Referring now to the drawings, FIG. 1 shows a telephone instrument I having circuit wires 12 to which the remote control device RC of the present invention is directly connected by means of a pair of wires 10. A nearby television set is indicated as TV. As shown, the physical location of the remote control device RC is such that it is able to transmit straight-line infrared signals direct to the TV set.

Figure 2:
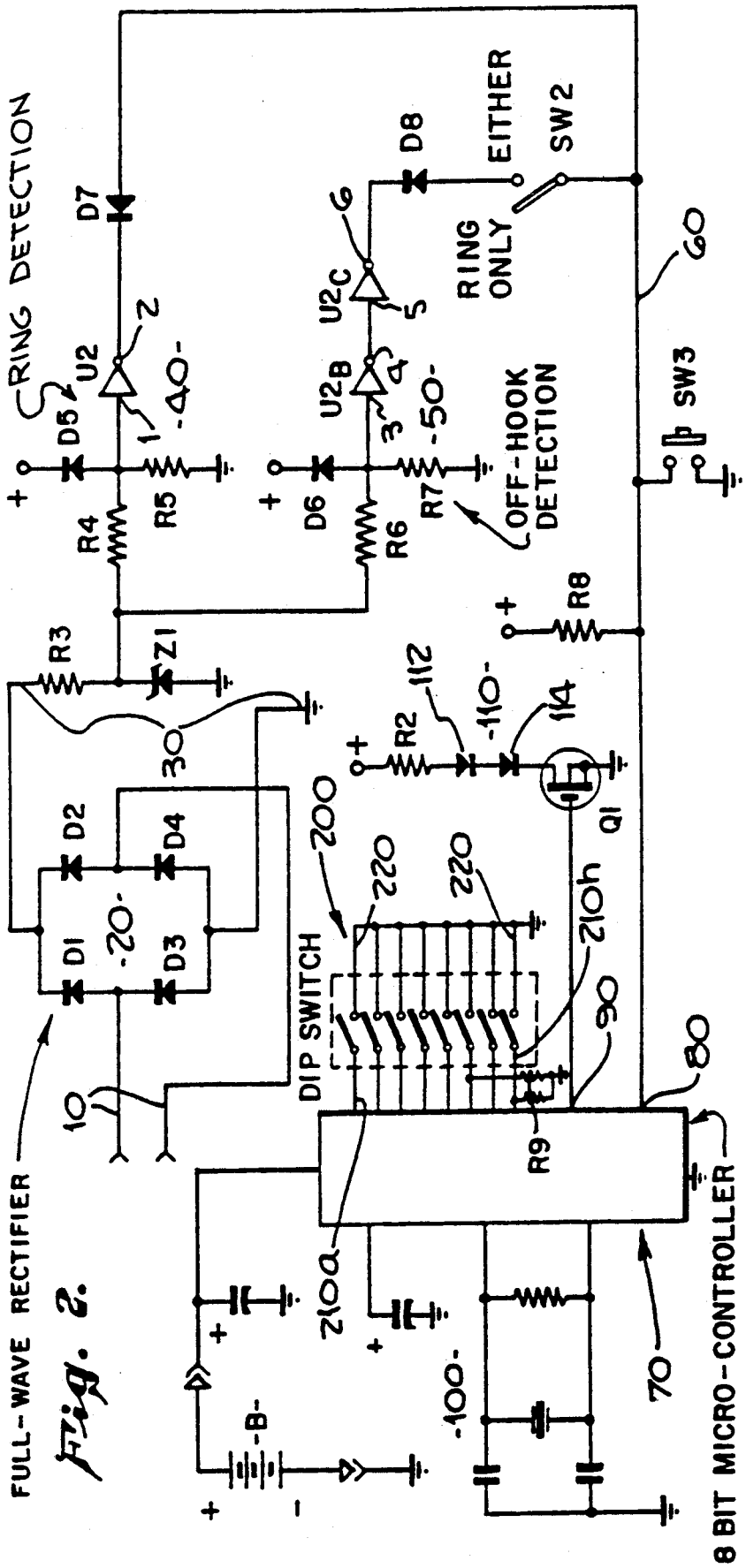
FIG. 2 is an electrical two-line schematic of the presently preferred form of the remote control device of FIG. 1.

FIG. 2 shows the schematic arrangement of the preferred form of the electrical circuit inside the remote control device RC. The pair of wires 10 are connectable to the telephone line. They feed a full-wave rectifier circuit 20 that includes four semiconductor diodes D1, D2, D3, and D4 which may, for example, be of type 1N4004. The output terminals of rectifier 20 are designated as 30, the positive terminal being connected to a resistor R3 while the negative terminal is grounded. A Zener diode Z1 has its cathode connected to the other end of resistor R3 and its anode is grounded. Thus a voltage signal taken from the telephone lines 12 is at all times being sampled and rectified so as to appear across the Zener diode Z1. In the event that this voltage signal were ever to exceed an instantaneous value of about 150 volts, the Zener diode will conduct and cut off the excess voltage.

The circuitry is energized from a battery B which typically includes three size AAA 1.5 volt cells having a combined output voltage of about 4.5 volts. The positive side of this supply voltage is designated in the drawing by a + sign.

A ring-detection circuit 40 has an input 41 connected to the cathode terminal of the Zener diode. In the ring-detection circuit a diode D5 which may be of type 1N4148 has its cathode connected to the positive supply voltage, while its anode is connected through a resistor R5 to ground. The anode of D5 is also connected through a resistor R4 to the input point 41 at the juncture of Z1 and R3. Resistors R4 and R5 provide a voltage divider in which R4 has a relatively large value such as 100K ohms while R5 has a smaller value such as 4.7K ohms.

Also in the ring-detection circuit, the juncture of D5 and R5 feeds terminal 1 of a device U2, which is one of the inverter units contained in a CMOS device Hex Inverter with Schmidt Trigger, preferably of type 74HC14. Its terminal 2 is connected to the cathode of a diode D7, which is preferably a type 1N4148. The anode of D7 is connected through a resistor R8 to the positive supply voltage. The juncture of R8 and D7 provides a connection point for an output on an Interrupt Request Line 60.

The operation of the ring-detection circuit is such that whenever a ringing signal appears across the telephone wires 12, a negative-going voltage signal appears on the Interrupt Request Line 60. The normal D.C. voltage on a telephone line is 48 volts. The typical telephone ringing signal has a frequency of about 10 Hz. and an A.C. voltage amplitude of about 100 volts RMS. When rectified, this signal typically presents a D.C. voltage well in excess of 50 volts to input 41 of the ring-detection circuit. Zener diode Z1 typically clamps at about 150 volts D.C. and will short out any signal portion which exceeds that level. The Zener diode is included principally for lighting protection.

An off-hook detection circuit 50 has an input connected to the same input point 41 as the ring detection circuit. Both the ring-detection circuit and the off-hook detection circuit are well known in the art.

According to the invention the ring-detection circuit 40 and the off-hook detection circuit 50 are arranged in parallel. The output of off-hook detection circuit 50 is connected through a single-pole single-throw switch SW2 to the Interrupt Request line 60. Thus when single-pole single-throw switch SW2 is in its normally closed position these two circuits have a common output. The utilization of switch SW2 is described in more detail in a later paragraph.

Returning now to the specific configuration of the off-hook detection circuit 50, it includes a resistor R6 having one end connected to the input point 41 while its other end is connected through a resistor R7 to ground. A diode D6, which may be of type 1N4148, has its anode connected to the juncture of resistors R6 and R7 while its cathode is connected to the positive voltage supply. Resistors R6 and R7 provide a voltage divider in which the resistor R6 is relatively large having a value such as 100K ohms while resistor R7 is smaller, such as 33K ohms. The juncture between diode D6 and resistor R7 is connected to input terminal 3 of a device U2B, which is the second identical unit of the CMOS device 74HC14 as previously described. Output terminal 4 of that unit is connected to input terminal 5 of a third unit U2C of the same device, and the output terminal 6 of that third unit is connected to the cathode of diode D8 whose anode is connected through switch SW2 to the Interrupt Request Line 60. The off-hook detection circuit produces a negative-going signal whenever the voltage on the phone lines drops below about four volts D.C.

A microchip circuit 70 has an input terminal 80, an output terminal 90, and also has a self-contained, crystal-controlled internal logical clock circuit which is illustrated at 100. Microchip circuit 70 is preferably an 8-Bit microcontroller Unit of the type manufactured by Motorola under its model designation MC68HCO5P1.

Interrupt Request Line 60 is connected to input terminal 80 of the microchip circuit, while an infrared signal generating circuit 110 is connected to an output terminal 90 of the microchip circuit.

Figure 3:
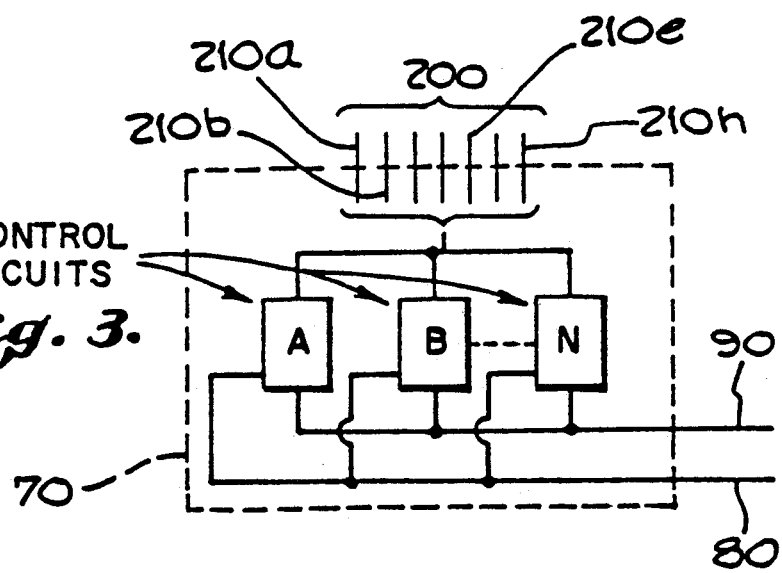
FIG. 3 is a schematic drawing of the permanently fixed internal logic circuits contained within the microchip circuit of FIG. 2, and is shown in a partially one-line form.

As shown in more detail in FIG. 3, microchip circuit 70 contains a plurality of permanently fixed internal logic circuits A, B, ... N. These logic circuits are constructed of firmware, i.e., they are not active memory circuits that require current flow to maintain the stored information. Each of these circuits respectively corresponds to the remote control logic of a particular type or model of commercially available television set. The input of each of these circuits is connected to the input line 80, and the output of each of these circuits is connected to the output terminal 90. Each of the circuits A, B, ... N also has eight separate inputs, which are controlled in a manner that will be described.

Within the microchip circuit 70 each of the logic circuits A, B, ... N involves a sophisticated set of logic circuits such that, when that particular logic circuit has been set by the selected combination of switch settings, an activating signal received on the input line 80 will cause the appropriate train of coded signals to be generated on the output line 90 of the chip circuit 70.

Figure 4A:
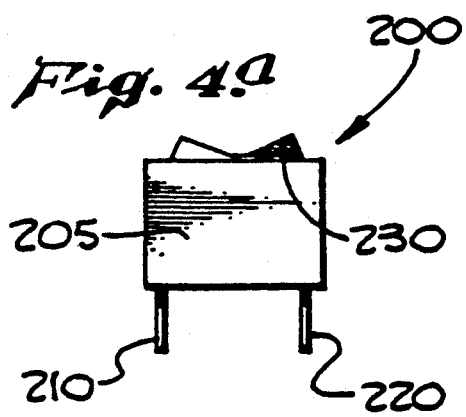
FIG. 4a is an end elevation view of a dual inline switch that is utilized in the apparatus of FIGS. 2 and 3.
Figure 4B:
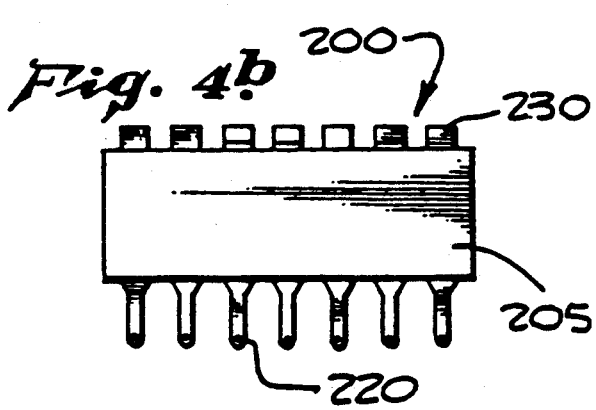

In the preferred embodiment of FIGS. 2-4 the operation of the microchip circuit 70 is controlled by a dual inline package (DIP) switch 200. FIG. 4a is an end view of the DIP switch 200, showing a solid body 205 of generally rectangular configuration which has two longitudinal rows 210, 220, of downwardly extending pins protruding from its under surface. The lateral separation of the two rows of pins is typically 0.1 inch, so that they fit into the same set of sockets as a standard integrated circuit. Protruding from its upper surface the body 205 has a row of two-position switch members 230, each of which controls the continuity (or lack thereof) between an associated pair of the pins 210, 220. Each switch member is manually switchable through an angle of about 25 to 30 degrees, and will retain the position to which it has been manually set.

In the DIP switch 200, each of eight switch members 230 is manually settable to either a binary 0 or a binary 1 condition, one of which corresponds to conductivity between the associated pins 210, 220, while the other corresponds to an open circuit. As shown in FIG. 2, all of the pins 220 are connected to a common ground. On the other side of the switch, however, the eight pins 210a, 210b, 210c, ... 210h are separately connected to the microchip circuit 70.

A pull-down resistor pack R9 is associated with the pins 210. It includes a separate resistor, preferably having a value of about one megohm, connecting each of the pins 210a, 210b, ... 210h to ground. It is needed because the microchip circuit 70 has floating inputs when bidirectional ports are switched to the input mode. Thus, if a given DIP switch position of the switch 200 is open, the voltage is forced to ground.

The eight separate inputs of the logic circuits A, B, ... N are controlled by the pins 210a, 210b, ... 210h, respectively, of DIP switch 200. Although FIG. 3 shows a single line coming into each of the logic circuits A, B, ... N, that is a schematic representation of the fact that all eight of the switch pins are connected to each of the logic circuits. When an input signal from line 80 is applied to one of the internal logic circuits A, B, ... N whose circuitry has been completed by the setting of DIP switch 200, the output line 90 then provides an output signal to the infrared generator 110.

In operation, a particular set of settings of all eight of the switch members 230 is required in order to activate any one of the logic circuits A, B, ... N in the microchip circuit 70. Customer instructions are provided with the remote control unit RC of the present invention in order to advise the customer as to which particular set of switch settings should be used in order to control the sound volume of a particular brand of television set.

Microchip circuit 70 is preferably a mask-programmable Motorola 68HCO5P1 microcontroller which is in effect a custom chip. In manufacturing the circuit 70, a mask is used to create the logic circuits A, B, ... N as firmware. Thus, the possible lack of energizing power does not affect the code setting of the remote control device RC. If battery B, FIG. 2, has to be replaced, no modification of the logic circuits or resetting of the switch settings is needed.

Infrared generator 110 includes a resistor R2, of typical value 33K ohms, connected to the positive voltage supply. A pair of infrared-emitting diodes 112, 114, are connected in series between the other end of resistor R2 and the collector electrode of a transistor Q1. Output line 90 of the microchip circuit 70 is connected to the base electrode of transistor 120, which is typically a type UN2222L. The function of transistor Q1 is to boost the current delivered to the infrared-emitting diodes, which typically require a current flow of about 100 milliamperes for proper operation.

Figure 5:
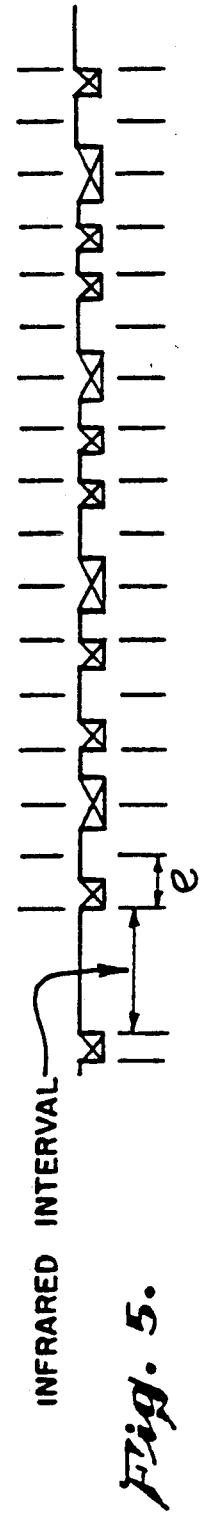
FIG. 5 shows a typical coded pulse train of the type which may be used in the operation of the invention.

FIG. 5 shows a typical example of a biphase pulse train which may be produced by the infrared generator 110 under control of the circuit 70 in response to an input signal received on the input line 80, when the appropriate selection of switch settings has previously been made.

When the device of the present invention is not in actual operation, it draws only about 10 microamperes of leakage current from the supply batteries.

Of course, if the owner of the equipment purchases a new TV set which is of a different make and has a different code for the control of muting action, it is then necessary to reset the switch members 230 in an appropriate manner to reflect the code identity of the new set.

SELECTION SWITCH SW2

Switch SW2 is a manually operable single-pole single-throw device used to select between the "RING ONLY" and the "EITHER RING or OFF-HOOK" conditions. Switch SW2 is open for the RING ONLY type of operation and is closed for the type of operation where device RC will respond to EITHER the RING or the OFF-HOOK condition. In the RING ONLY position, the device RC will mute the TV set only when an incoming call activates the ring-detect circuit. In the EITHER RING or OFF-HOOK position the device RC will mute the TV set when either a ringing condition or an off-hook condition exists. This control becomes important in the situation where a single telephone line has two or more instruments that are located in different rooms. Thus, if the person watching the TV set does not wish to be disturbed when an outgoing call is made by some other person from a different room, he need only set the switch SW2 to the RING ONLY (or open) position.

MANUAL MUTE SWITCH SW3

A negative-going activating signal must be fed from Interrupt Request Line 60 to the input 80 of microchip circuit 70 in order to either initiate or terminate the muting action of the device RC. Switch SW3 connected between Interrupt Request Line 60 and ground which is normally open but may be operated manually to mute or unmute the TV set. Momentary closing of the switch SW3 creates both negative-going and positive-going signals, but only the negative-going signal is an effective input for the microchip. After a call has been received or the phone line has gone to the OFF HOOK condition because of an outgoing call being made, the person who is watching the TV set may momentarily close switch SW3 so as to unmute the set. When there is no signal from the telephone circuit, but muting is desired for some other reason, the switch SW3 can be manually closed to achieve that result. An additional use of switch SW3 is to check the remote control unit RC for proper operation without the necessity of having an input signal generated from the telephone line.

MODES OF OPERATION

In view of the foregoing description it is apparent that the remote-control device of the present invention provides at least four different modes of operation.

In one mode of operation the sound output of an associated television set is automatically muted in response to either the ringing of the telephone, or the placement of an outgoing call.

In another mode of operation, when the switch SW-2 has been placed in the RING ONLY position, the television sound will be automatically muted if the telephone rings, but not in response to an outgoing call.

In a third mode of operation the sound output of the television is muted manually, by use of switch SW-3, even though the telephone is not ringing and no outgoing call has been placed.

In a fourth mode of operation the sound output of the television is manually unmuted.

ALTERNATIVE USE OF RADIO LINK

The invention has been illustrated in its presently preferred form such that the remote control RC is a single unit which is hard-wired to the telephone lines. However, it is also possible to interpose between Interrupt Request Line 60 and the input line 80 of chip circuit 70 a separate radio transmission link of a type commonly used in wireless security systems, garage door openers, or cordless telephones. In that event the remote control device RC is divided into two separate physical units. The principles of the present invention are still be applicable, however.

SECOND EMBODIMENT

Figure 7:
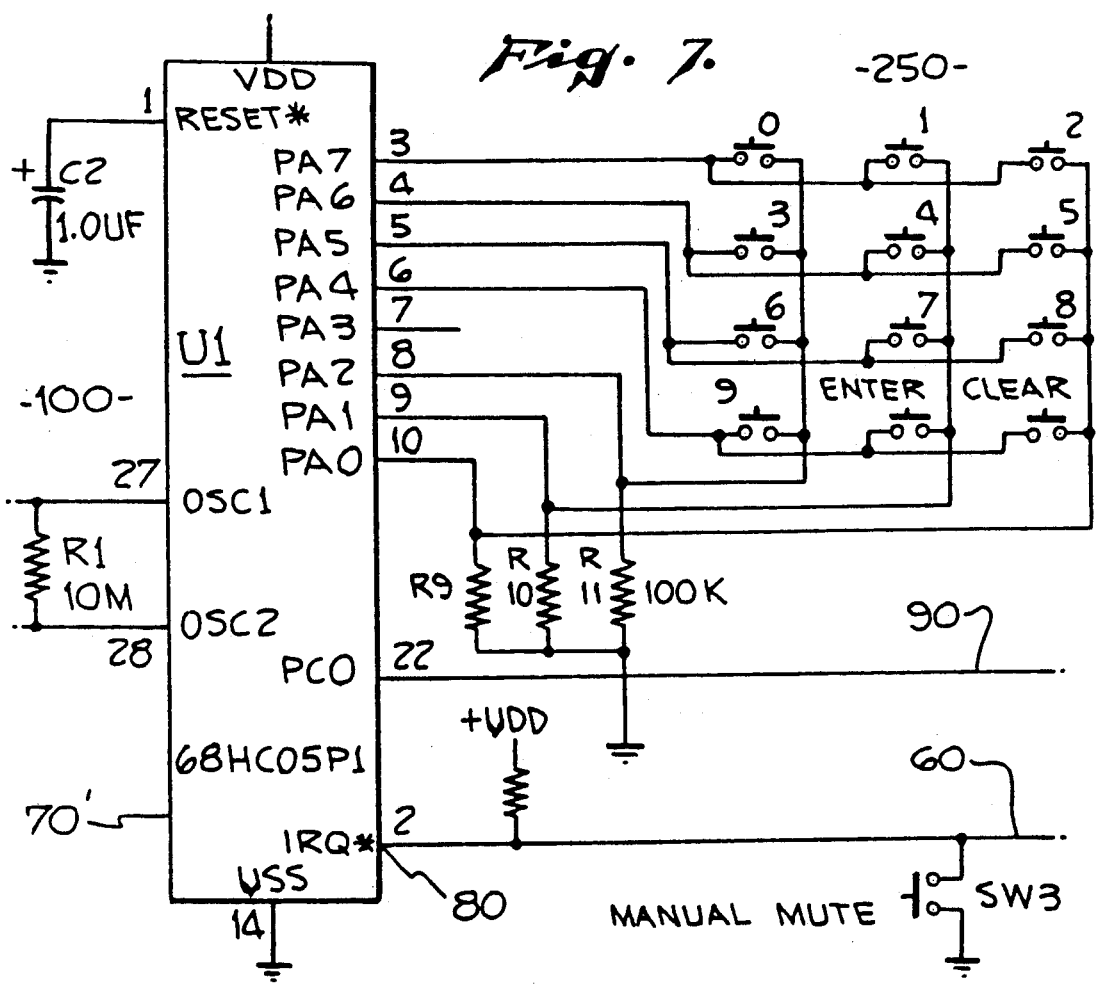
FIG. 7 is a two-line schematic diagram of the modified circuit of FIG. 6.
Figure 6:
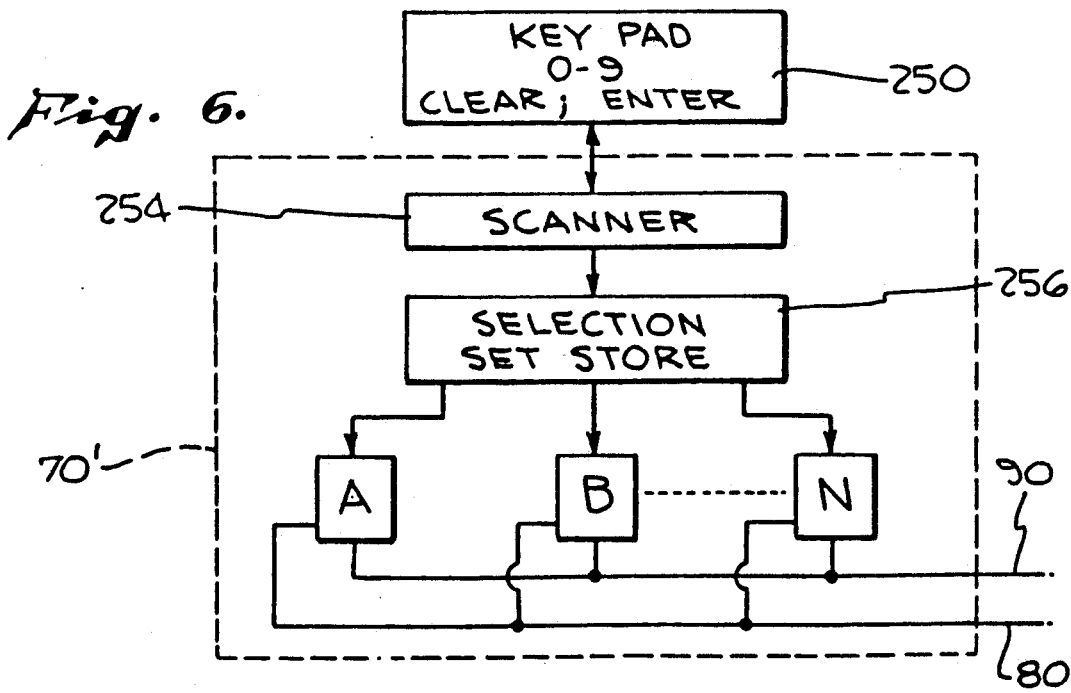
FIG. 6 is a schematic diagram, shown in a partially one-line form, of circuit modifications in accordance with a second embodiment of the invention.

Reference is now made to FIGS. 6 and 7 which illustrate a second embodiment of the invention including an alternate form of circuitry for selecting the particular TV set with which the remote control is to operate. The microcontroller circuit 70 is replace with a modified microcontroller circuit 70', and a key pad 250 is substituted for the DIP switch 200. The operating circuitry, including ring detection, off-hook detection, and switches SW-2 and SW-3, may be the same as before.

As shown schematically in one-line form in FIG. 6 a key pad 250 having keys 0 through 9 is used for designating a selected TV set. A scanner circuit 254 contained within the modified microchip controller 70' then scans the key pad settings and stores the resulting selection set in a selection set store circuit 256. The output of selection set store circuit 256 is fed to fixed internal logic circuits A, B, . . . N of the controller 70' and hence activates a selected one of those circuits. Fixed logic circuits A, B, . . . N may be the same as in the previous embodiment.

The key pad circuit 254 is of conventional construction, and FIG. 7 illustrates it in a two-line schematic form. In addition to the keys 0 through 9 there are keys for ENTER and for CLEAR. Each of the twelve keys selectively connects one of the four terminals PA7, PA6, PA5, and PA4 to one of the three terminals PA2, PA1, or PA0. Although output signals produced by the operation of the key pad are not shown, they are conventional. Scanner circuit 254 contained within microcontroller 70' stores the signals in a selection set store circuit 256, also contained within the modified microcontroller. In the event that batteries energizing the remote control device RC (the modified form of RC) must be replaced, the signals in store circuit 256 will be lost. However, the user may conveniently write the code for his particular TV set on a surface of the remote control device, or an associated tag, and can then easily re-establish the set selection after batteries have been replaced.

While the presently preferred from of the invention has been disclosed in considerable detail in order to comply with the patent laws, such detailed disclosure is not intended to limit the spirit or scope of the invention, which is defined only in the appended claims.

We claim:

1. Apparatus responsive to the operation of a nearby telephone for muting the sound output of a television set, comprising;
   signal responsive means coupled to the telephone for detecting either a ringing signal or an off-hook condition of the telephone, and for producing an output signal in response thereto;
   remote-control means having an input coupled to said signal responsive means and responsive to an output signal therefrom for muting the sound output of the television set; and
   manually operable means for selectively disabling said signal responsive means to prevent the manually operable means from responding to an off-hook condition of the telephone while still permitting it to respond to a ringing signal.

2. Apparatus as in claim 1 wherein:
   said signal responsive means includes an off-hook detection circuit and a ring detection circuit;
   said manually operable means includes a single-pole, singlethrow, switch connected in series with said off-hook circuit; and
   the series combination of said off-hook detection circuit and said switch is coupled in parallel with said ring detection circuit.

3. The apparatus of claim 1 which further includes a manually operable, push-button type, momentary contact switch coupled to the input of said remote-control means for selectively superseding the operation of said signal responsive means.

4. The apparatus of claim 2 which further includes a manually operable, push-button type, momentary contact switch coupled to the input of said remote-control means for selectively superseding the operation of said signal responsive means.

5. Apparatus as in claim 1 wherein said signal-responsive means includes:
- a microchip circuit having an input, an output, a logical clock for controlling its internal operation, and a plurality of internal logic circuits which respectively correspond to the respectively different remote volume control codings of various different makes of television sets,
- an interrupt-request line coupled to said input of said microchip circuit for delivering an activating signal thereto, and
- signal detection means including a ring detection circuit and an off-hook detection circuit coupled both to the telephone and to said interrupt-request line and responsive to operation of the telephone for delivering the activating signal to said interrupt-request line; and
- wherein said remote-control means includes an infrared signal transmitting means connected to said output of said microchip circuit.

6. The apparatus of claim 5 which further includes a manually operable, push-button type, momentary contact switch coupled to the input of said remote-control means for selectively superseding the operation of said signal responsive means.

7. Apparatus as in claim 2 wherein said signal-responsive means includes:
- a microchip circuit having an input, an output, a logical clock for controlling its internal operation, and a plurality of internal logic circuits which respectively correspond to the respectively different remote volume control codings of various different makes of television sets,
- an interrupt-request line coupled to said input of said microchip circuit for delivering an activating signal thereto, and
- signal detection means including a ring detection circuit and an off-hook detection circuit coupled both to the telephone and to said interrupt-request line and responsive to operation of the telephone for delivering the activating signal to said interrupt-request line; and
- wherein said remote-control means includes an infrared signal transmitting means connected to said output of said microchip circuit.

8. The apparatus of claim 7 which further includes a manually operable, push-button type, momentary contact switch coupled to the input of said remote-control means for selectively superseding the operation of said signal responsive means.

9. A device used cooperatively with a telephone and with a nearby television set selected from various makes of television sets that are responsive to remote volume control by infrared signals in accordance with respectively different volume control codings, for responding to a signal from the telephone and for automatically muting the sound output of the television set so long as the telephone is in use, comprising:
- a microchip circuit having an input, an output, and a logical clock for controlling its internal operation;
- an interrupt-request line coupled to said input of said microchip circuit for delivering an activating signal thereto;
- signal detection means coupled both to the telephone and to said interrupt-request line and normally responsive to the operation of the telephone for supplying an activating signal to said interrupt-request line;
- infrared signal transmitting means connected to said output of said microchip circuit;
- said microchip circuit also having a plurality of internal logic circuits which respectively correspond to the respectively different remote volume control codings of the various different makes of television sets;
- a dual inline switch having a plurality of switch members each manually settable to a selected 0 or 1 condition;
- said dual inline switch being so connected to said microchip circuit that a predetermined group of settings of said switch members may be chosen in order to select a particular one of said internal logic circuits that corresponds to the remote volume control coding of the selected television set, so that said microchip circuit responds to an activating signal at said input thereof for producing at said output thereof a coded signal corresponding to the remote volume control coding for the selected television set which is then transmitted through said infrared signal transmitting means to said selected television set and mutes the output sound volume thereof so long as an activating signal continues to be received from the telephone; and
- manually operable means for selectively superseding the normal operation of said signal detection means.

10. A device used cooperatively with a telephone and with a nearby television set selected from various makes of television sets that are responsive to remote volume control by infrared signals in accordance with respectively different volume control codings, for responding to a signal from the telephone and for automatically muting the sound output of the selected television set so long as the telephone is in use, comprising:
- a microchip circuit having an input, an output, and a logical clock for controlling its internal operation;
- an interrupt-request line coupled to said input of said microchip circuit for delivering an activating signal thereto;
- signal detection means including a ring detection circuit and an off-hook detection circuit, coupled both to the telephone and to said interrupt-request line, and responsive to operation of the telephone for delivering the activating signal to said interrupt-request line;
- infrared signal transmitting means connected to said output of said microchip circuit;
- said microchip circuit also having a plurality of internal logic circuits which respectively correspond to the respectively different remote volume control codings of the various different makes of television sets;
- a dual inline switch having a plurality of switch members each manually settable to a selected 0 or 1 condition;
- said dual inline switch being so connected to said microchip circuit that a predetermined group of settings of said switch members may be chosen in order to select a particular one of said internal logic circuits that corresponds to the remote volume control coding of the selected television set, so that said microchip circuit responds to an activating signal at said input thereof for producing at said output thereof a coded signal corresponding to the remote volume control for the selected television set which is then transmitted through said infrared signal transmitting means to said selected television set and mutes the output sound volume thereof so long as an activating signal continues to be received from the telephone; and manually operable switch means for selectively disabling said off-hook detection circuit.

11. A device used cooperatively with a telephone and with a nearby television set selected from various makes of television sets that are responsive to remote volume control by infrared signals in accordance with respectively different volume control codings, for responding to a signal from the telephone and for automatically muting the sound output of the selected television set so long as the telephone is in use, comprising:

a microchip circuit having an input, an output, and a logical clock for controlling its internal operation;

an interrupt-request line coupled to said input of said microchip circuit for delivering an activating signal thereto;

signal detection means including a ring detection circuit and an off-hook detection circuit, coupled both to the telephone and to said interrupt-request line, and responsive to operation of the telephone for delivering the activating signal to said interrupt-request line;

infrared signal transmitting means connected to said output of said microchip circuit;

said microchip circuit also having a plurality of permanently fixed internal logic circuits which respectively correspond to the different remote volume control codings of the various different makes of television sets;

manually operable means for selectively generating a group of code settings which represent a desired one of said remote volume control codings; and means for applying said group of code settings to said microchip circuit such that said microchip circuit responds to an activating signal at said input thereof for producing at said output thereof a coded signal corresponding to the desired one of said remote volume control codings for the selected television set which is then transmitted through said infrared signal transmitting means to said selected television set and mutes the output sound volume thereof so long as an activating signal continues to be received from the telephone.

12. The apparatus of claim 11 wherein said means for selectively generating a group of code settings includes a DIP switch.

13. The apparatus of claim 11 wherein said means for selectively generating a group of code settings includes a key pad and a selection set store.

14. The apparatus of claim 11 which further includes manually operable switch means for selectively disabling said off-hook detection circuit.

15. The apparatus of claim 12 which further includes manually operable switch means for selectively disabling said off-hook detection circuit.

16. The apparatus of claim 13 which further includes manually operable switch means for selectively disabling said off-hook detection circuit.

17. Apparatus responsive to the operation of a nearby telephone for muting the sound output of a television set, comprising;

signal responsive means coupled to the telephone for detecting either a ringing signal or an off-hook condition of the telephone, including a ring detection circuit and an off-hook detection circuit coupled in parallel between the telephone and a common output and responsive to operation of the telephone for delivering an activating signal to said common output;

remote-control means havin an input, and being selectively operable for muting the sound output of a television set;

a controller circuit coupled between said common output of said ring detection and off-hook detection circuits, and said input of said remote-control means, and having a plurality of permanently fixed internal logic circuits which respectively correspond to the different remote volume control codings of various different makes or models of television sets; and manually operable means for selecting a particular one of said fixed internal logic circuits so as to enable said remote-control means to respond to operation of the telephone for muting a television set whose remote volume control coding corresponds to said particular one fixed logic circuit.

18. The apparatus of claim 17 which further includes manually operable means for selectively disabling said signal responsive means to respond to an off-hook condition of the telephone while still permitting it to respond to a ringing signal.

19. Apparatus as in claim 18 wherein said manually operable means includes a single-pole, single-throw, switch connected in series with said off-hook detection circuit between the telephone and said common output.

20. The apparatus of claim 17 which further includes a manually operable, push-button type, momentary contact switch coupled to the input of said remote-control means for selectively superseding the operation of said signal responsive means.

21. The apparatus of claim 17 which further includes manually operable switch means for selectively disabling said off-hook detection circuit.

22. The apparatus of claim 19 which further includes a manually operable, push-button type, momentary contact switch coupled to the input of said remote-control means for selectively superseding the operation of said signal responsive means.

23. The apparatus of claim 21 which further includes a manually operable, push-button type, momentary contact switch coupled to the input of said remote-control means for selectively superseding the operation of said signal responsive means.

24. Apparatus responsive to the operation of a nearby telephone for selectively muting the sound output of a television set, comprising;

signal responsive means including a ring detection circuit and an off-hook detection circuit coupled in parallel between the telephone and a common output, for detecting either a ringing signal or an off-hook condition of the telephone, and responsive to operation of the telephone for delivering an activating signal to said common output;

remote-control means having an input, and being selectively operable for muting the sound output of a television set;

a controller circuit coupled between said common output of said ring detection and off-hook detection circuits, and said input of said remote-control means, and including a plurality of permanently fixed internal logic circuits which respectively correspond to different remote volume control codings of various different makes or models of television sets;

manually operable means for selecting a particular one of said fixed internal logic circuits so as to enable said remote-control means to respond to operation of the telephone for muting the sound output of a television set whose remote volume control coding corresponds to said particular one fixed logic circuit; and a manually operable, push-button type, momentary contact switch coupled to the input of said remote-control means for selectively superseding the operation of said signal responsive means.

25. The apparatus of claim 24 which further includes manually operable switch means for selectively disabling said off-hook detection circuit.

26. Apparatus as in claim 25 wherein said manually operable switch means includes a single-pole, single-throw, switch connected in series with said off-hook detection circuit between the telephone and said common output.

* * * * *